United States Patent
Fujishima et al.

(10) Patent No.: US 8,078,033 B2
(45) Date of Patent: *Dec. 13, 2011

(54) RECORDING APPARATUS

(75) Inventors: Yoshikazu Fujishima, Daito (JP); Ryusuke Noda, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1189 days.

This patent is subject to a terminal disclaimer.

(21) Appl. No.: 11/497,327

(22) Filed: Aug. 2, 2006

(65) Prior Publication Data

US 2007/0031118 A1   Feb. 8, 2007

(30) Foreign Application Priority Data

Aug. 2, 2005   (JP) .................................. 2005-224367

(51) Int. Cl.
  *H04N 5/80*   (2006.01)
(52) U.S. Cl. ............ 386/250; 386/249; 386/251; 725/32
(58) Field of Classification Search .................... 386/46, 386/95, 80, 45, 108, 124–126, 250, 249, 386/251
  See application file for complete search history.

(56) References Cited

U.S. PATENT DOCUMENTS

2003/0185128 A1* 10/2003 Shoji et al. ................. 369/59.25
2004/0190855 A1* 9/2004 Poslinski ........................ 386/46
2005/0002644 A1* 1/2005 Nakamura et al. ............... 386/52
2006/0013557 A1* 1/2006 Poslinski ........................ 386/46
2007/0031120 A1* 2/2007 Fujishima et al. .............. 386/95

FOREIGN PATENT DOCUMENTS

| JP | H11-088807 A | 3/1999 |
| JP | 2000-354225 | 12/2000 |
| JP | 2002-152687 A | 5/2002 |
| JP | 2004-328477 A | 11/2004 |
| JP | 2005-142853 A | 6/2005 |

* cited by examiner

*Primary Examiner* — Helen Shibru

(74) *Attorney, Agent, or Firm* — Pillsbury Winthrop Shaw Pittman, LLP

(57) ABSTRACT

A recording apparatus includes a recording unit that records a televised program being received by a receiving unit to a disk-shaped recording medium. The recording apparatus also includes a commercial message detecting unit that detects a switch from main program to commercial message and a switch from commercial message to main program when the recording unit is recording the program. The recording unit records the program to the recording medium with chapter breaks set at first time intervals when commercial messages inserted in the main program are being received by the receiving unit, and set at second time intervals when the main program is being received by the receiving unit.

3 Claims, 4 Drawing Sheets

RECORDING APPARATUS

CROSS REFERENCE

This Nonprovisional application claims priority under 35 U.S.C. §119(a) on Patent Application No. 2005-224367 filed in Japan on Aug. 2, 2005, the entire contents of which are hereby incorporated by reference.

BACKGROUND OF THE INVENTION

The present invention relates to a recording apparatus that records a televised program to a disk-shaped recording medium such as a DVD.

Conventionally, recording apparatuses that receive televised programs and record the received programs to disk-shaped recording media such as DVD (digital versatile disk), HD (hard disk), or the like are in widespread use. With this type of recording apparatus, programs recorded to recording media are divided into chapters. The start of each chapter can be directly specified as a position for skipping to (skip position) during playback. In other words, the user is able to skip the playback position to the start of any chapter with a simple operation during playback of programs recorded on recording media. Conventional recording apparatuses record programs to disk-shaped recording media while marking chapters at predetermined time intervals of 10 or 15 minutes, for example.

Given that most television stations broadcast programs with commercial messages (hereinafter, "CMs") inserted in the main program, JP 2000-354225A proposes a recording apparatus that does not record CMs inserted in the main program to the recording medium, but does record positions where there is a switch from CM to main program to the recording medium as the start of chapters. With this recording apparatus, recording media can be used effectively since CMs inserted in the main program are not recorded to the recording media. Also, because CMs are not recorded to recording media as noted above, the main program can be played continuously without needing to perform operations such as fast-forwarding CMs during playback. Scenes in a program often change before and after CMs, making these positions suitable as chapter breaks for the user to specify as skip positions during playback.

JP 2000-354225A also discloses that CMs inserted in the main program may be recorded to the recording medium. In this case as well, CM skipping can be performed during playback with a simple operation, by recording positions where there is a switch from CM to main program to the recording medium as the start of chapters.

However, the apparatus disclosed in JP 2000-354225A is based on the idea that all CMs inserted in the main program are of no value to the user. Thus, even if the CMs inserted in the main program includes those that are of value to the user, those CMs are not recorded to the recording medium. Consequently, the user is not able to watch CMs that are of value to him or her, and cannot obtain information from those CMs.

On the other hand, if the method is adopted whereby CMs inserted in the main program are recorded to the recording medium, the user is able to watch CMs that are of value to him or her and obtain information from these CMs by playing the recorded CMs. However, only some rather than all of the plurality of CMs recorded on the recording medium will be of value to the user. Also, CMs of value to the user may not be among the plurality of CMs recorded on the recording medium. The user is unable to judge whether CMs of value to him or her have been recorded before playing the program. Consequently, the user does not know whether CMs of value to him or her have been recorded unless he or she checks the recorded CMs one at a time.

Conventional apparatuses were not able to skip CMs one at a time with a simple operation. Thus, the user had to repeatedly perform operations related to fast-forwarding and rewinding to check CMs recorded on the recording medium. Consequently, user operability was poor when checking whether CMs of value to the user had been recorded.

An object of the present invention is to provide a recording apparatus capable of skipping CMs inserted in the main program recorded on a recording medium one at a time with a simple operation during playback.

SUMMARY OF THE INVENTION

A recording apparatus according to the present invention includes a recording unit that records a televised program being received by a receiving unit to a disk-shaped recording medium such as a DVD (digital versatile disk), HD (hard disk), or the like. The recording apparatus also includes a commercial message detecting unit that detects a switch from main program to commercial message and a switch from commercial message to main program when the recording unit is recording the program. This commercial message detecting unit may, for example, be configured to judge that the main program is being received in the case of a preset audio mode, and that a commercial message is being received in the case of other audio modes, or to distinguish a commercial message from the main program based on changes in the audio level, or to measure the time period for which the audio mode is constant, and distinguish a commercial message from the main program based on this time period. The recording unit then records the program to the recording medium with chapters marked at first time intervals when commercial messages inserted in the main program are being received by the receiving unit, and at second time intervals when the main program is being received by the receiving unit. The first and second time intervals are preset. The first time preferably is set to 15 seconds, since commercial messages in television broadcasts are normally 15 seconds. On the other hand, the second time interval may be a fixed time of 10 or 15 minutes, for example, or can be arbitrarily set by the user.

With this configuration, the start positions of commercial messages inserted in the main program recorded on a recording medium, except for the initial commercial message following a switch from the main program, are marked as chapters. Consequently, it is possible, with a simple operation, to skip to the start of the next commercial message recorded consecutively with the commercial message currently being played or to the start of the main program recorded consecutively with the commercial message currently being played. Thus, the user is able, with a simple operation, to confirm whether any of the commercial messages inserted in the main program recorded on a recording medium are of value to him or her, and watch those commercial messages that are confirmed to be of value.

DETAILED DESCRIPTION OF THE INVENTION

Figure 1:
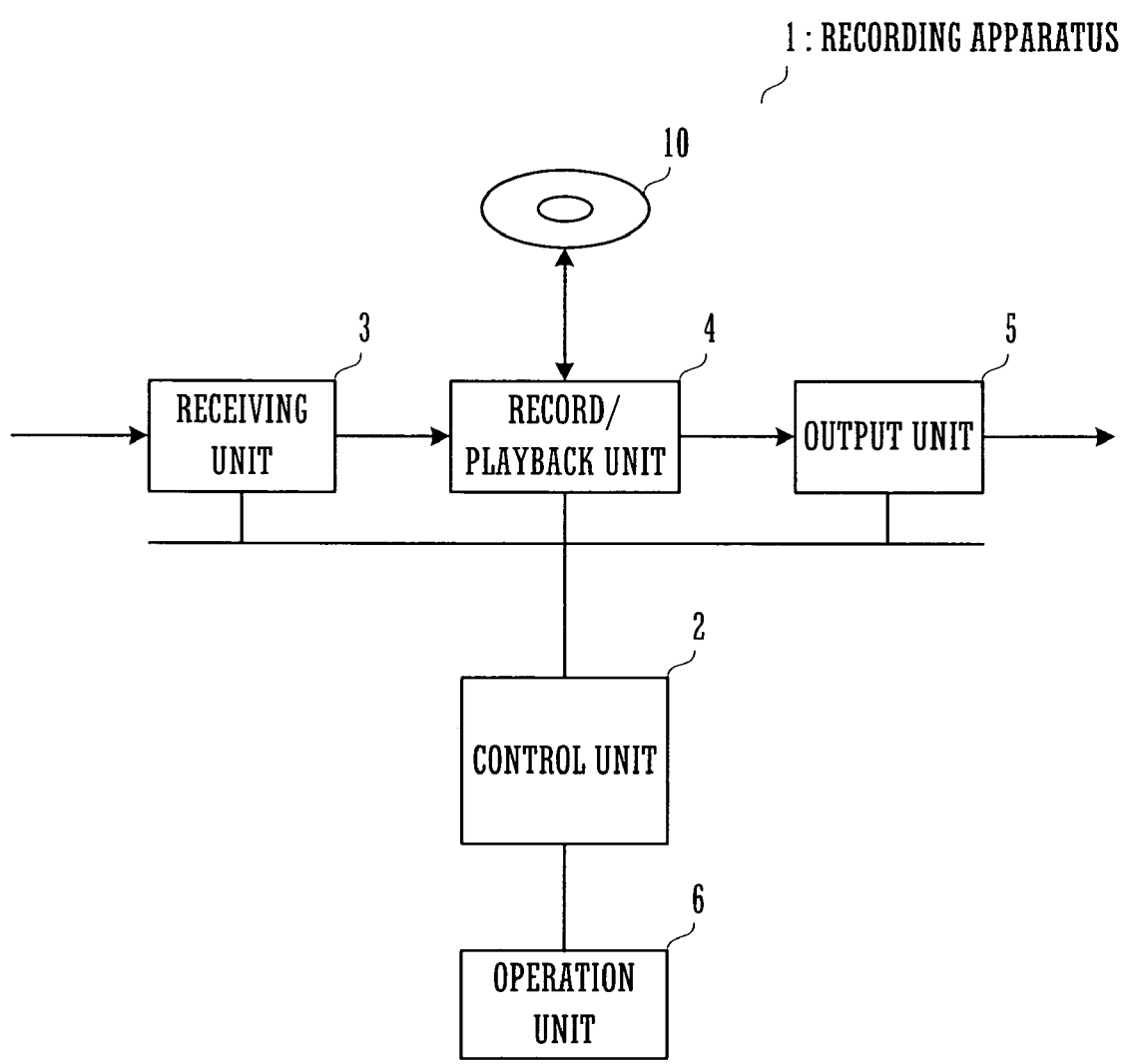
FIG. 1 is a block diagram showing the configuration of a main part of a recording apparatus according to an embodiment of the present invention.

FIG. 1 is a block diagram showing the configuration of a main part of a recording apparatus according to an embodiment of the present invention. A recording apparatus 1 of the present embodiment includes a control unit 2 that controls the operation of the recording apparatus 1, and a receiving unit 3 that receives the broadcast wave of a television broadcast. The recording apparatus 1 also includes a record/playback unit 4 that records video and audio resulting from broadcast wave received by the receiving unit 3 to a DVD 10 (digital versatile disk) loaded, as well as reading data recorded on the DVD 10 (recorded data) and playing the read data, and an output unit 5 that outputs a playback signal played by the record/playback unit 4. The recording apparatus 1 further includes an operation unit 6 for performing input operations on the recording apparatus 1. The receiving unit 3 has a publicly known tuner for extracting a television broadcast signal that is broadcast on a selected channel. This television broadcast signal includes video and audio of a broadcast program or commercial message (hereinafter "CM"). The receiving unit 3 separates the television broadcast signal of the selected channel into a video signal and an audio signal, and inputs the video and audio signals to the record/playback unit 4. The record/playback unit 4 encodes the video and audio signals input from the receiving unit 3 to obtain a video stream and an audio stream. The record/playback unit 4 then obtains a system stream in which the video and audio streams have been packetized into prescribed units. The video and audio signals are encoded using MPEG, for example. The record/playback unit 4 records the system stream to the DVD 10. The record/playback unit 4 has a pickup head for irradiating a laser beam onto the DVD 10, and records video and audio received by the receiving unit 3 to the DVD 10 by controlling the laser beam irradiated onto the DVD 10 by the pickup head based on the multiplexed system stream. The record/playback unit 4 generates information (playback menu information) showing the start position of each chapter (recording address on the DVD 10) when recording the system stream to the DVD 10. The playback menu information is recorded in a prescribed area (lead-in area) of the DVD 10. Chapters are marked at preset first time intervals or second time intervals. The marking of chapters is described hereinafter.

The record/playback unit 4 can also perform reading that involves irradiating a laser beam of lower power than for recording onto the DVD 10, and detecting the reflected light as the system stream of video and audio in a program recorded on the DVD 10. Further, the record/playback unit 4 separates the system stream read from the DVD 10 into a video stream and an audio stream, decodes the video and audio streams, and outputs video and audio. The output unit 5 converts the video and audio decoded by the record/playback unit 4 into signals compatible with a display apparatus (not shown) and a speaker (not shown) that are connected to the output unit 5, and outputs the signals. The operation unit 6 has operation keys provided on the recording apparatus 1, and a remote control receiving unit for receiving control signals transmitted to the recording apparatus 1 from a remote control apparatus not shown in the drawings. The DVD 10 for recording the program received by the receiving unit 3 is detachable from the recording apparatus 1.

Note that the recording apparatus 1 of the present embodiment is also able to record a program to the DVD 10 using a well-known timer recording function. Settings related to timer recording such as the timer recording start and end times can be performed with the operation unit 6 or the remote control apparatus. The recording apparatus 1 also has a one touch recording function for recording a program or CM that is broadcast on a channel being received by the receiving unit 3 at that time, by performing a prescribed input operation (operation of a record key).

As is well known, most television stations broadcast programs with CMs inserted in the main program. The audio signal of a broadcast wave includes information showing the audio mode as being a stereo broadcast, a bilingual broadcast, a monaural broadcast, or the like. The recording apparatus 1 of the present embodiment has a function for detecting whether a broadcast wave received by the receiving unit 3 is the main program or a CM, based on changes in the audio signal of the broadcast wave. For example, the audio mode of the main program is set in advance, and the recording apparatus 1 has a function for detecting a broadcast wave whose audio mode is the preset audio mode as the main program and a broadcast wave whose audio mode is other than the preset audio mode as a CM. Since information showing the audio mode is included in the audio signal of broadcast waves as noted above, the recording apparatus 1 is able to detect the audio mode of a broadcast wave being received by the receiving unit 3 by reading this information.

Alternatively, utilizing the fact that silent intervals exist between the main program and CMs as well as between individual CMs, the recording apparatus 1 may be configured to detect CMs from a broadcast wave received by the receiving unit 3 by detecting changes in the audio level; that is, by detecting silent intervals. Further, given that the broadcast time period of CMs is shorter than the continuous broadcast time period of the main program, the recording apparatus 1 may be configured to measure changes in the audio mode and the time period that the audio mode remains constant (unchanged), and detect CMs from a broadcast wave received by the receiving unit 3 based on this information.

Note that the recording apparatus 1 may be configured combining any of the above configurations so as to detect whether a broadcast wave being received by the receiving unit 3 is the main program or a CM.

The marking of chapters in the recording apparatus 1 of the present embodiment is described here. The recording apparatus 1 of the present embodiment marks chapters at preset first time intervals or second time intervals when recording a program being received by the receiving unit 3 to the DVD 10. The recording apparatus 1 marks chapters at first time intervals when CMs inserted in the program are being received, and at second time intervals when the main program is being received. The first time interval is fixed at 15 seconds, given that CMs in television broadcasts are normally 15 seconds. On the other hand, the user is able to freely set the second time interval by performing a prescribed input operation on the operation unit 6 or the remote control apparatus. The second time interval is set to 10 or 15 minutes, for example. The first and second time intervals are stored in a memory provided in the control unit 2.

When there is a switch from main program to CM, however, a chapter is marked mandatorily, irrespective of the first and second time intervals. Specifically, when there is a switch from main program to CM, the position of the switch from main program to CM is mandatorily set as a chapter break.

Chapters are then marked at first time intervals for the duration that CMs continue to run. The start of each CM is thus set as a chapter break, given that CMs in a television broadcast are normally 15 seconds, as noted above. The recording apparatus 1 marks chapters at second time intervals when there is a switch from CM to main program.

Note that although a chapter break may also be mandatorily set where there is a switch from CM to main program, in most cases this position will be set as a chapter break without performing additional processing, given that chapters are marked at 15 second intervals at this point in time, and also given that a single CM is 15 seconds.

The recording apparatus 1 of the present embodiment also has a chapter skip function for skipping to the next chapter break, that is, the start of the next chapter, from the playback position at the time that an input operation related to chapter skipping is performed during playback of a program recorded on the DVD 10, and recommencing playback from there.

The operation of the recording apparatus 1 of the present embodiment is described below.

Figure 2:
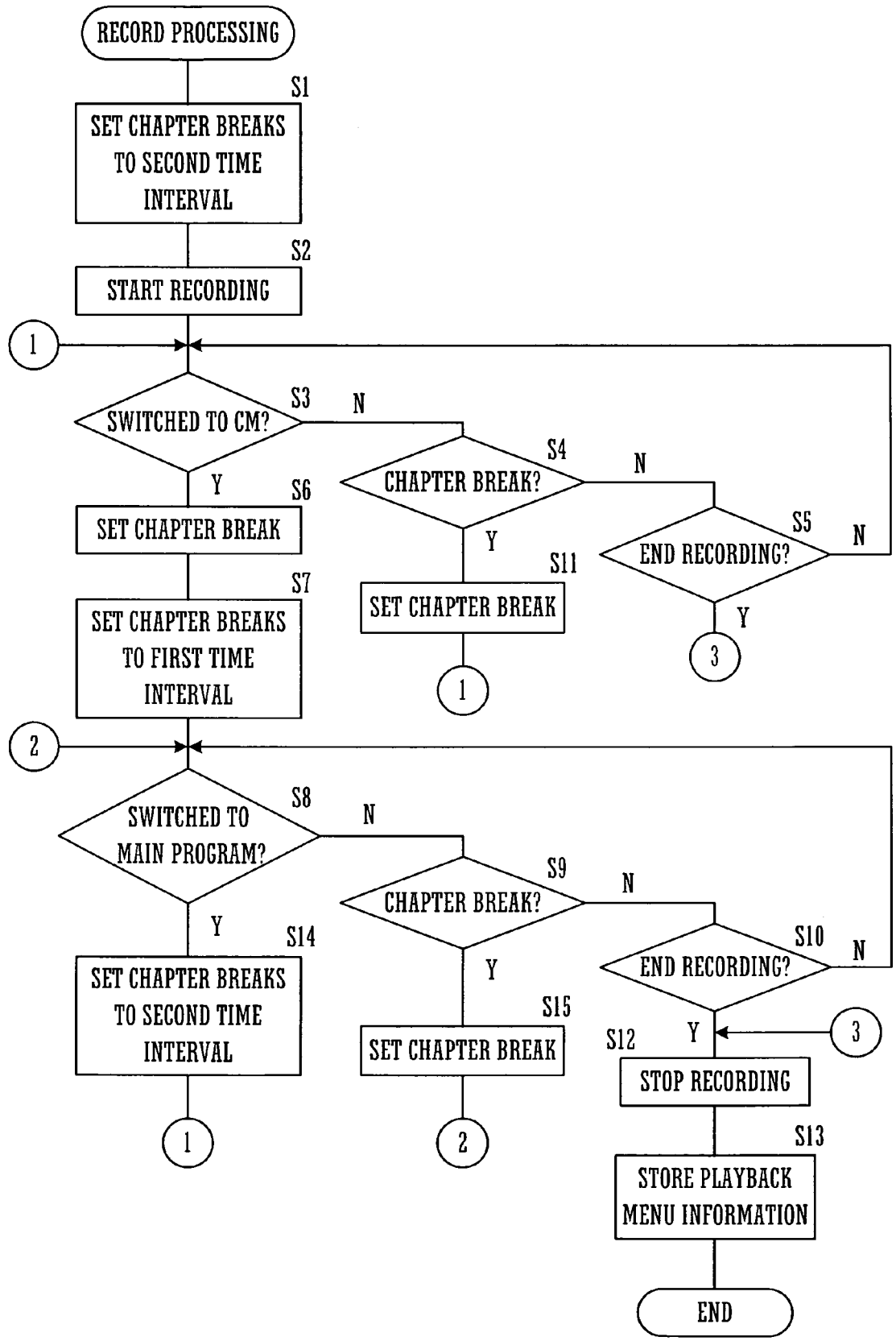
FIG. 2 is a flowchart showing record processing in a recording apparatus according to an embodiment of the present invention.

Record processing in the recording apparatus 1 is described firstly. FIG. 2 is a flowchart showing record processing in the recording apparatus 1 of the present embodiment. This record processing is started when the recording start time of a program preset for recording arrives or when the record key of either the operation unit 6 or the remote control apparatus is operated. The receiving unit 3 of the recording apparatus 1 receives the broadcast wave of a specified channel at this time. The specified channel is a channel that has been preset for recording in the case of recording using the timer recording function, and is a channel received by the receiving unit 3 at that time in the case of recording resulting from operation of the record key.

The recording apparatus 1 sets the time interval for marking chapters to the second time interval (S1). The recording apparatus 1 starts recording the program based on the television broadcast signal of the channel being received by the receiving unit 3 (S2). At S2, the receiving unit 3 separates the television broadcast signal of the channel being received into a video signal and an audio signal, and inputs the video and audio signals to the record/playback unit 4. The record/playback unit 4 encodes the video and audio signals input from the receiving unit 3 to obtain a video stream and an audio stream. The record/playback unit 4 then obtains a system stream in which the video and audio streams have been packetized into prescribed units and multiplexed, and starts processing to record the system stream to the DVD 10. Since the recording of a system stream to the DVD 10 is publicly known, description is omitted here. The recording apparatus 1 performs publicly known OPC prior to recording the program to the DVD 10, and obtains the optimum power for the laser beam irradiated onto the DVD 10 during recording. The recording apparatus 1, having started recording the program at S2, waits for a switch from main program to CM (S3), waits until the position for a chapter break has been reached (S4), or waits for the recording end timing to arrive (S5). At S3, the recording apparatus 1 detects that there has been a switch from main program to CM based on changes in the audio signal of the received broadcast wave, as noted above. At S4, the recording apparatus 1 judges that the position for a chapter break has been reached when the second time interval has elapsed from the previous chapter break. The recording apparatus 1, having judged at S4 that the position for a chapter break has been reached, sets the current position as a chapter break (S11), and returns to S3 to repeat the above processing. At S11, the recording apparatus 1 generates information (playback menu information) showing the position at which the chapter was marked; that is, the start of the chapter (recording address in the DVD 10). At S5, the recording apparatus 1 judges that the recording end timing has arrived when the preset recording end time of the program arrives, during recording that results from timer recording. The recording apparatus 1 also judges that the recording end timing has arrived when a recording end key of either the operation unit 6 or the remote control apparatus is operated. The recording apparatus 1, having judged at S5 that the recording end timing has arrived, stops recording the program to the DVD 10 (S12), and records playback menu information generated during the recording of the program to a prescribed recording area of the DVD 10, which is normally the lead-in area (S13), before ending the processing.

Further, the recording apparatus 1, having judged at S3 that there has been a switch from main program to CM, sets the position of the switch from main program to CM as a chapter break (S6). At S6, the recording apparatus 1 generates information (playback menu information) showing the position at which the chapter was marked; that is, the start of the chapter (recording address in the DVD 10). The recording apparatus 1, having set the position of the switch from main program to CM as a chapter break at S6, changes the interval for marking chapters from the second time interval to the first time interval (here, 15 seconds) (S7). CMs in television broadcasts are mostly 15 seconds. The recording apparatus 1, having set the interval for marking chapters to 15 seconds at S7, waits for a switch from CM to main program (S8), waits until the position for a chapter break has been reached (S9), or waits for the recording end timing to arrive (S10). The processing of S9 and S10 is respectively the same as S4 and S5. At S9, however, the recording apparatus 1 judges that the position for a chapter break has been reached when the first time interval (here, 15 seconds) has elapsed since the previous chapter break.

The recording apparatus 1, having judged at S8 that there has been a switch from CM to main program, changes the time interval at which chapters are marked from the first time interval to the second time interval (S14), and returns to S3 to repeat the above processing. The recording apparatus 1, having judged at S9 that the position for a chapter break has been reached, sets this position as a chapter break (S15), and returns to S8 to repeat the above processing. The processing related to S15 is the same as S11. Further, the recording apparatus 1, having judged at S10 that the recording end timing has arrived, executes the processing related to S12 and S13 referred to above, and ends the processing.

Figure 3:
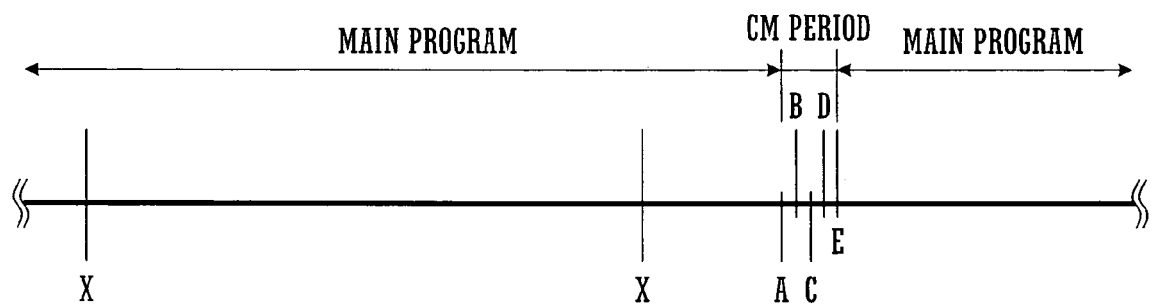
FIG. 3 illustrates a chapter break in a program recorded on DVD by a recording apparatus according to an embodiment of the present invention.

In this way, the recording apparatus 1 of the present embodiment records televised programs to the DVD 10, while marking chapters at second time intervals in relation to the main program, and at first time intervals in relation to CMs. In other words, chapters in programs recorded to the DVD 10 are marked at second time intervals of 10 minutes, for example, in relation to the main program, as shown in FIG. 3. Points X shown in FIG. 3 are chapter breaks in the main program. Chapters are marked at first time intervals, which is here 15 seconds, in relation to CMs. Further, the position at which there is a switch from main program to CM (point A shown in FIG. 3) is also marked by a chapter, as is the position at which there is a switch from CM to main program (point E shown in FIG. 3). Points B, C and D shown in FIG. 3 are each the start of a CM, and these positions are also set as chapter breaks. In the CM period in FIG. 3, the four points A, B, C, and D are the start positions of CMs. The recording apparatus 1 is thus configured to mark chapters at first time intervals, that is, 15 second intervals, in relation to CMs inserted in a program, enabling programs to be recorded to the DVD 10 while marking chapters for every CM as shown in FIG. 3. Information concerning the positions marked by chapters is recorded in a prescribed recording area (lead-in area) of the DVD 10 as playback menu information.

Figure 4:
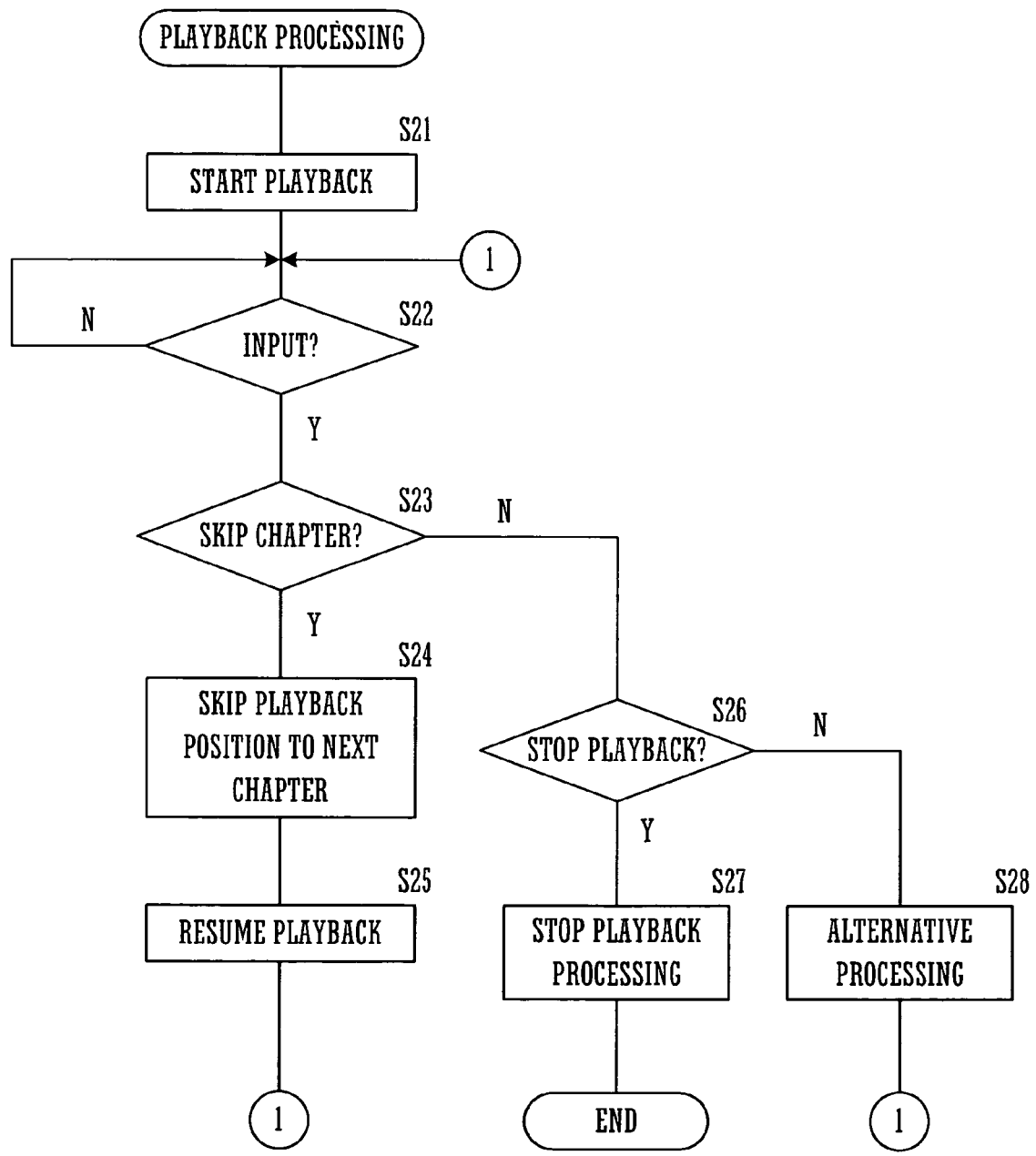
FIG. 4 is a flowchart showing playback processing in a recording apparatus according to an embodiment of the present invention.

Playback processing in the recording apparatus 1 is described next. FIG. 4 is a flowchart showing playback processing in the recording apparatus 1 of the present embodiment. The recording apparatus 1 starts this processing when a play key of either the operation unit 6 or the remote control apparatus is operated. The record/playback unit 4 of the recording apparatus 1 starts playing a program specified for playback out of the programs recorded on the DVD 10 (S21). At this time, the recording apparatus 1 reads the playback menu information of the program for playback and obtains the chapter breaks in this program. Playing a program recorded on the DVD 10 involves the record/playback unit 4 reading a system stream recorded on the DVD 10, and obtaining a video stream and an audio stream from the read system steam. The record/playback unit 4 then decodes the video and audio streams, and outputs the decoded video and audio streams to the output unit 105. The output unit 5 converts the video and audio streams decoded by the record/playback unit 4 to signals compatible with the display apparatus (not shown) and the speaker (not shown) that are connected to the output unit 5, and outputs the signals.

The recording apparatus 1, having started playback at S21, waits for an input. When there is an input to the recording apparatus 1 at S22, and the input relates to chapter skipping (S23), the recording apparatus 1 skips the playback position from the current playback position to the start of the next chapter (S24), and resumes playback from there (S25). For example, when an input related to chapter skipping is made immediately after playing point A shown in FIG. 3, the recording apparatus 1 skips the playback position to point B shown in FIG. 3 and resumes playback. Again, when an input related to chapter skipping is made immediately after playing point C shown in FIG. 3, the recording apparatus 1 skips the playback position to point D shown in FIG. 3 and resumes playback, before returning to S22.

Since the recording apparatus 1, when recording a program to the DVD 10, marks the start of every CM inserted in the program as a chapter as noted above, the user is able to skip CMs one at a time by performing an operation related to chapter skipping during playback. Consequently, the user can, with a simple operation, confirm whether any of the CMs inserted in the main program recorded on the DVD 10 are of value to him or her, and watch those CMs that are confirmed to be of value.

The recording apparatus 1, having judged that the input relates to stopping playback rather than chapter skipping (S26), stops playback (S27) and ends the processing. Further, if the input does not relate to stopping playback, the recording apparatus 1 performs processing (alternative processing) according to the input (S28). This alternative processing executed at S28 includes pause playback, pause cancellation, or the like.

Note that although the present invention is described in the foregoing embodiment using the example of a recording apparatus 1 that records a program to the DVD 10, the present invention can be applied in a recording apparatus 1 that records a program to other random-access recording media such as hard disk (HD) or the like.

Finally, the description of the foregoing embodiment is in all respects illustrative and not limiting. The scope of the invention is indicated by the scope of the claims rather than by the foregoing embodiment. Further, all changes that come within the meaning and range of equivalency of the claims are intended to be embraced in the scope of the invention.

What is claimed is:

1. A recording apparatus comprising:
    a receiving unit that receives a televised program;
    a recording unit that records the program being received by the receiving unit to an optical disk; and
    a commercial message detecting unit that detects a switch from main program to commercial message and a switch from commercial message to main program by detecting a change in an audio mode of an audio signal included in the program being received by the receiving unit and measuring a time period for which the audio mode is constant when the recording unit is recording the program,
    wherein the recording unit:
        sets a chapter break based on a preset first time interval upon the switch from main program to commercial message being detected by the commercial message detecting unit;
        sets the chapter break, based on a second time interval which is longer than the first time interval, upon the switch from commercial message to main program being detected by the commercial message detecting unit; and
        records, in a lead-in area of the optical disk, information showing a start position of each chapter that is set based on the first time or the second time;
    wherein the recording apparatus further comprises:
        a playback unit that reads the information recorded in the lead-in area of the optical disk and playbacks the program recorded on the optical disk based on the information; and
        an operation unit that receives input for setting the second time interval.

2. The recording apparatus according to claim 1, wherein the commercial message detecting unit detects the switch from main program to commercial message and the switch from commercial message to main program by further detecting a change in a level of the audio signal of the program being received by the receiving unit.

3. The recording apparatus according to claim 1, wherein the first time interval is 15 seconds.

* * * * *